Jan. 4, 1949. W. A. HYLAND 2,457,900
GRAIN DRILL FEED MECHANISM
Filed Sept. 18, 1944 2 Sheets-Sheet 1

*INVENTOR.*
WILLIAM A. HYLAND

Jan. 4, 1949.  W. A. HYLAND  2,457,900
GRAIN DRILL FEED MECHANISM
Filed Sept. 18, 1944  2 Sheets-Sheet 2

INVENTOR.
WILLIAM A. HYLAND

Patented Jan. 4, 1949

2,457,900

UNITED STATES PATENT OFFICE 2,457,900

GRAIN DRILL FEED MECHANISM

William A. Hyland, Horicon, Wis., assignor to John Deere Van Brunt Company, a corporation of Wisconsin Application September 18, 1944, Serial No. 554,654

4 Claims. (Cl. 222—311)

1

The present invention relates generally to agricultural implements and more particularly to seeding machines, such as grain drills and the like. More particularly, the present invention is concerned with the seed feeding devices for such implements.

Heretofore, one form of seed feeding device that has been very satisfactory for use with the small grains, such as oats, wheat, rye, and others, has not proven entirely satisfactory for use with the larger seeds, such as peas. The type of seed feeding device with which the present invention is more particularly concerned, is known as the force feed type, and consists generally of a seed cup and a rotatable seed wheel having a flared flange that is ribbed on its radially inner side, forming with the seed cup a seed passage of more or less uniformly decreasing cross sectional area and terminating in a throat portion through which the seeds are discharged in a uniform and controlled manner by the rotation of the seed wheel. When using the larger seeds, such as peas, it has been noted that there is a tendency for the peas to jam or bridge across the throat of the feed cup, generally in a vertical direction, it being understood that the ordinary seed cup is arranged so that the seeds pass through the throat generally in the lower portion of the feed cup and generally horizontally rearwardly. Efforts have been made to prevent jamming and bridging of the seed at this point and several forms of feed cups have appeared in which some form of shoulder or other abrupt obstruction is disposed in the throat, but so far as my tests have shown, they have not produced satisfactory results and in general have aggravated rather than solved the problem of the jamming of the larger seeds.

The object and general nature of the present invention is the provision of a force feed seeding device of the above-mentioned type, in which means in or adjacent the throat of the seed passage serves to prevent the jamming or bridging of seeds across from the flange of the seed wheel to the inner portion of the seed passage, such means preferably taking the form of a rounded protuberance having smooth wall portions and disposed adjacent the radially outer portion of the throat section of the seed cup and shaped so as to tend to lift out of contact with the seed wheel flange any seed that tends to bridge or jam across the throat portion from the radially outward part of the radially inner part thereof. In thus tending to lift the seed out of contact with the seed wheel at some point before they actually become jammed, jamming and bridging of the seed are

2 prevented yet the smooth uniform flow of seed through the throat is not in any way restricted.

These and other objects and advantages of the present invention will be apparent to those skilled in the art after a consideration of the following detailed description, taken in conjunction with the accompanying drawings in which the preferred form of the present invention has been illustrated.

Figure 1:
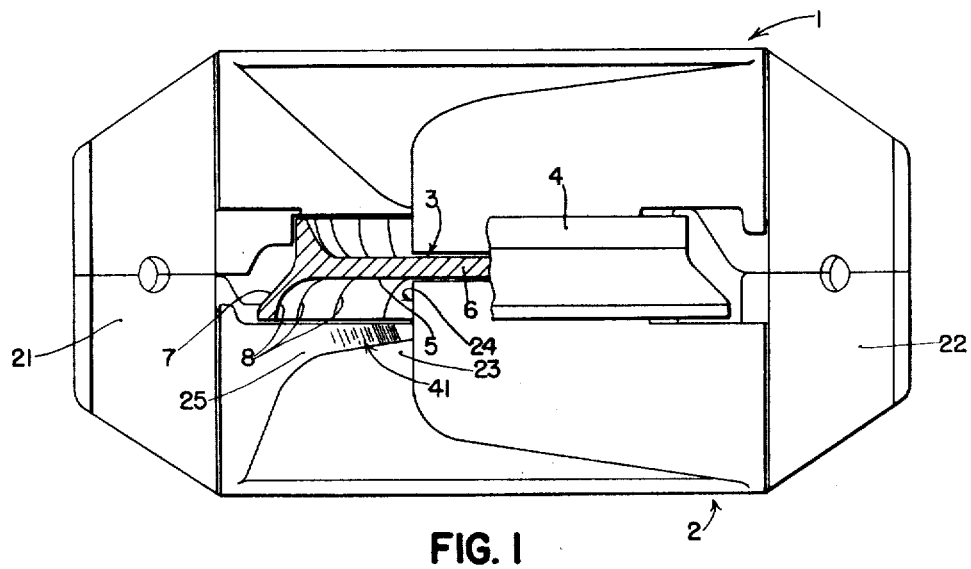
Figure 1 is a plan view of a feed cup incorporating the principles of the present invention.
Figure 2:
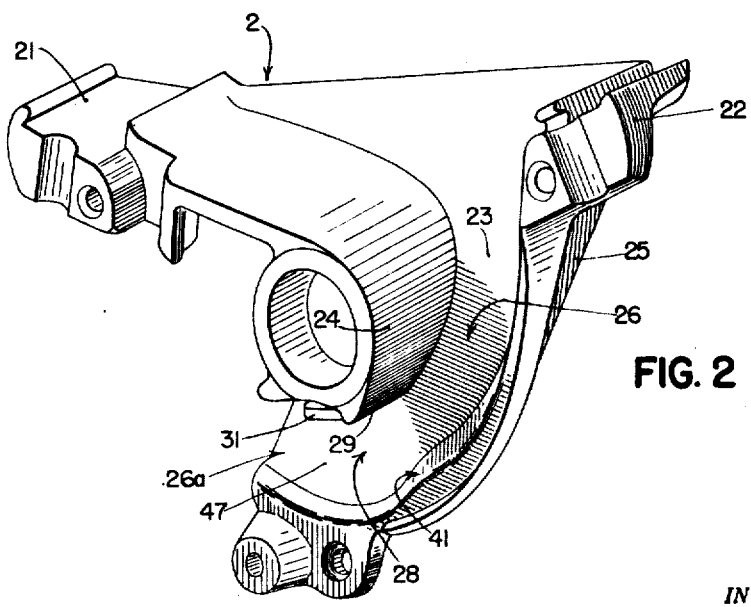
Figure 2 is a perspective view of my improved feed cup member.

Referring first to Figure 1, the seed feeding device in which the principles of the present invention have been incorporated, comprises a pair of right and left hand feed cups 1 and 2 with a double faced feed wheel 3 disposed there-between and a cap 4, a part of which is broken away in Figure 1, carried by the feed cups 1 and 2 and embracing the upper portion of the feed wheel 3. The construction shown in Figure 1 comprises what is known as a double run force feed, by which is meant that the feed wheel 3 has two feeding faces cooperating, respectively, with seed passages formed in the two feed cups 1 and 2. By means of a suitable cover, not shown, one or the other of the seed passages may be closed, thus selecting one or the other of the seeding units for operation. One side of the feed wheel is smaller than the other, likewise the associated seed passage is somewhat smaller than the other, as in conventional practice. Since the present invention is more directly concerned with certain improvements by which the larger seed may be distributed in a uniform and controlled manner, further reference to the small side of the double run feed unit shown in Figure 1 will be omitted.

The large side of the feed wheel 3 is indicated by the reference numeral 5 and includes a flat web section 6 and a flaring flange section 7 having agitator ribs 8 extending generally transversely thereof. The feed wheel 3 is held in position between the two feed cups 1 and 2 by virtue of a hub 9 formed on one side of the wheel 3 and seating in a bearing sleeve section 11 on the associated feed cup parts 1. The feed wheel 3 has a square opening 14 therein to receive a square seeding shaft 15 by rotation of which the several feed wheels associated with the shaft 15 are driven.

Figure 3:
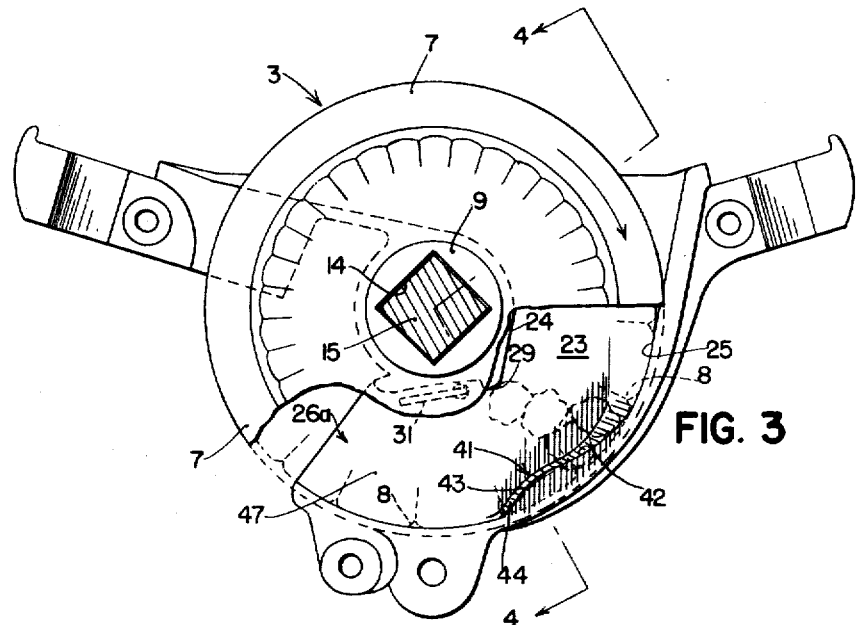
Figure 3 is a side view showing my improved feed cup member with the feed wheel mounted therein.
Figure 5:
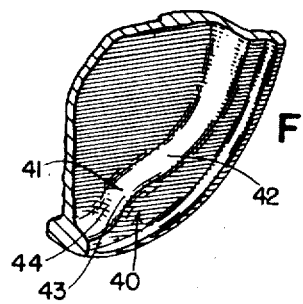
Figure 5 is a fragmentary perspective view of a portion of the feed cup forming a part of the present invention.
Figure 4:
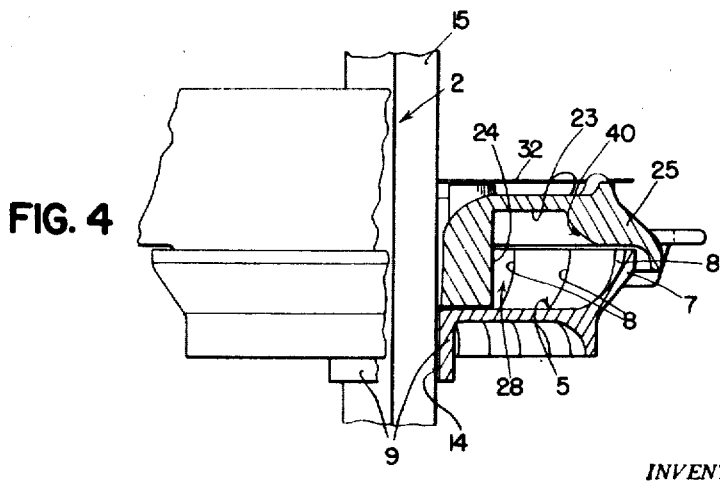
Figure 4 is an enlarged fragmentary sectional view taken generally along the line 4—4 of Figure 3, showing the cross sectional configuration of the throat portion of the force feed device.

The feed cup 2 which particularly cooperates with the large side 5 of the feed wheel 3 comprises attaching lugs 21 and 22 by which the feed cup may be fastened to the bottom of a seed box or the like, and generally downwardly and forwardly curving wall portions 23, 24 and 25 which form, with the associated feed wheel, a seed passage 26 that curves generally about the axis of rotation as defined by the seeding shaft 15 and which progressively decreases in diameter in the direction of rotation of the feed wheel, as indicated by the arrow in Figure 3, the passage 26 terminating in a throat section 28, best shown in Figure 4. At this point the radially inner wall 24 of the seed passage terminates in a shoulder 29 behind which an adjustable gate 31, controlled by a lever 32, is mounted. The gate 31 operates between the rear extension 47 of the seed passage wall 23, the extension 47 being generally flat and forming with the feed wheel a discharge opening that generally is of greater cross sectional area than the throat portion 28.

It has been found in practice that with conventional feeding devices there is some tendency when using the larger seeds, such as peas, for the seeds to bridge across the throat 28 generally in a vertical, or radially inwardly extending, direction between the agitating ribs 8 on the rotatable feed wheel 3 and some opposite point on the inner wall 24 or hub of the feed cup, generally as indicated in dotted lines in Figure 3. In order to prevent the seed from getting into a position where they become jammed across the throat section, I provide an obstruction in the bottom of the seed cup, particularly in the bottom of the throat portion 28 thereof. Such an obstruction is shown in the drawings by the reference numeral 40 and comprises a rounded protuberance 41 formed in the feed cup 3 at the radially outer portion thereof closely adjacent the path of movement of the feed cup flange 7. The protuberance 41, preferably but not necessarily an integral part of the feed cup, includes generally radially inwardly sloping portions 42 leading with a small angle up to the apex 43 of the projection 41 followed by portions 44 of decreasing radial extension, joining the main portion of the feed cup with smooth curving configuration. As best shown in Figure 4, the protuberance or projection 41 provides wall surfaces which not only face generally radially inwardly but also generally toward the face 5 of the feed wheel 3, forming with the flange 7 thereof a generally V-shaped bottom for the throat portion 28. The highest point of the projection 41 lies at an appreciable distance above or radially inwardly of the flange 7 as it passes the protuberance 40 whereby the higher portion of the latter lies appreciably above the ribs 8.

In operation, as best shown in Figure 3, the gently sloping walls 42, 43 and 44 of the projection or protuberance 40, act to cause the seed to ride above or move away from the agitating ribs 8 on the feed wheel until the seed has been discharged through the throat of the feed cup. For example, if there should arise any tendency for the seed to bridge or jam between the flange 7 and some opposite portion of the feed cup, the rotation of the wheel 3 tending to carry the outermost seed along with it acts at the same time to move the seed along the protuberance 40, particularly along the sloping approach walls 42 thereof. This, as just mentioned, causes the seed to move away from the wheel so as to momentarily be out of contact with the latter, whereby it is no longer possible for the seed to be forced or jammed into a self-sustaining bridge. The cross sectional area of the discharge portion 28a of the seed passage is approximately the same as or slightly greater than, the cross sectional area of the throat portion 28, and therefore after the seeds have been discharged through the throat 28, their movement through and out of the discharge openings of the seed cup is accomplished in a uniform and free flowing movement.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a seeding device, a seed cup, a rotatable feed wheel mounted for rotation in said cup and including a seed-engaging outer flange, a seed passage formed by portions of said seed cup and said feed wheel, said passage being shaped so as to have a throat portion through which seed normally are discharged by the rotation of said feed wheel, and a protuberance carried by the radially outer portion of said seed cup adjacent the periphery of said feed wheel and having a cam-like wall extending generally radially inwardly beyond said feed wheel flange and having a smooth curve generally forwardly in the direction of rotation of said feed wheel and generally radially inwardly up to the apex of said protuberance and then generally radially outwardly away from said apex, said apex lying appreciably above, or radially inwardly of, the inner surface of said feed wheel flange between the flange of said feed wheel and the opposite side of said seed passage.

2. A feed cup having an inner wall, an outer wall, a side wall connecting said inner and outer walls, said walls converging to form a throat and said side wall merging into an extension wall extending beyond said throat, and a protuberance formed on the outer wall and extending partly across the throat toward the inner wall substantially at the junction between said side wall and said extension wall.

3. In a seeding device, a seed cup, a rotatable feed wheel mounted for rotation in said cup, said seed cup having an inner wall, an outer wall, a side wall connecting said inner and outer walls, said walls converging to form a throat and said side wall merging into an extension wall extending beyond said throat, a gate-protecting shoulder extending into said throat toward the outer wall substantially at the junction between said side wall and said extension wall, and a protuberance formed on the outer wall and extending radially inwardly with an apex portion disposed opposite said shoulder substantially at the junction between said side wall and said extension wall and sloping generally radially away from said apex in opposite directions with respect to the rotation of the feed wheel.

4. In a seeding device, a seed cup, a rotatable feed wheel mounted for rotation in said cup and including a seed-engaging outer flange, said seed cup having an inner wall, an outer wall, a side wall connecting said inner and outer walls, said walls converging to form a throat and said side wall merging into an extension wall extending beyond said throat, a gate-protecting shoulder extending into said throat toward the outer wall substantially at the junction between said side wall and said extension wall, and a protuberance formed on the outer wall and extending radially inwardly with an apex portion disposed opposite said shoulder substantially at the junction between said side wall and said extension wall and sloping generally radially away from said apex in opposite directions with respect to the rotation of the feed wheel, the apex portion lying appreciably above, or radially inwardly of, the inner surface of said feed wheel flange so as to prevent the larger seed from binding and bridging between said flange of said feed wheel and the gate-protecting shoulder, the radially inner face of said protuberance lying at an angle to the face of the feed wheel so as to form therewith a generally V-shaped bottom for said throat.

WILLIAM A. HYLAND.

REFERENCES CITED

The following references are of record in the file of this patent:

UNITED STATES PATENTS

| Number | Name | Date |
|---|---|---|
| 710,852 | Morris | Oct. 27, 1902 |
| 2,327,923 | Fretzer | Aug. 24, 1943 |